United States Patent [19]

Haitmanek

[11] Patent Number: 5,167,542
[45] Date of Patent: Dec. 1, 1992

[54] INTERCONNECTABLE COMPONENTS EMPLOYING A MULTI-POSITIONABLE KEY

[75] Inventor: Louis F. Haitmanek, Florham Park, N.J.

[73] Assignee: Thomas & Betts Corporation, Bridgewater, N.J.

[21] Appl. No.: 741,698

[22] Filed: Aug. 7, 1991

Related U.S. Application Data

[63] Continuation of Ser. No. 473,010, Jan. 31, 1990, Pat. No. 5,041,025.

[51] Int. Cl.$^5$ .............................................. H10R 13/64
[52] U.S. Cl. .................................................... 439/681
[58] Field of Search ............... 439/354, 677, 678, 679, 439/680, 681; 350/96.20, 96.21, 96.22

[56] References Cited

U.S. PATENT DOCUMENTS

| | | |
|---|---|---|
| 127,509 | 4/1872 | Peterson et al. |
| 135,052 | 1/1873 | Wetmore . |
| 541,159 | 6/1895 | Fleischman . |
| 841,688 | 1/1907 | Hodges . |
| 842,575 | 1/1907 | McMahon . |
| 1,033,845 | 7/1912 | Wall . |
| 2,286,950 | 6/1942 | Breedlove ............... 85/32 |
| 2,417,928 | 3/1947 | Guernsey ................ 173/361 |
| 3,023,394 | 2/1962 | Hubbell ................. 439/681 X |
| 3,139,492 | 6/1964 | Cage, Jr. ............... 200/11 |
| 3,315,210 | 4/1967 | Cull . |
| 3,426,315 | 2/1969 | DeTar ................... 439/681 |
| 3,462,727 | 8/1969 | Blight et al. . |
| 3,582,867 | 6/1971 | Thompson et al. . |
| 4,756,593 | 7/1988 | Koakutsu et al. ........ 439/680 X |
| 4,798,440 | 1/1989 | Haffer et al. ........... 350/96.20 |
| 4,832,625 | 5/1989 | Puerner ................. 439/681 |
| 4,872,736 | 10/1989 | Myers et al. .......... 439/353 X |
| 4,875,753 | 10/1989 | Kalomiris ............. 350/96.20 |
| 4,925,400 | 5/1990 | Blair et al. ........... 439/681 X |
| 4,929,184 | 5/1990 | Emadi et al. ......... 439/681 |
| 4,979,792 | 12/1990 | Weber et al. ........ 350/96.20 |
| 4,982,083 | 1/1991 | Graham et al. ...... 250/227.11 |
| 5,016,968 | 5/1991 | Hammond et al. ... 350/96.20 |

FOREIGN PATENT DOCUMENTS

| | | |
|---|---|---|
| 2940457 | 4/1980 | Fed. Rep. of Germany . |
| 8902168 | 8/1988 | PCT Int'l Appl. . |
| 2035721 | 6/1980 | United Kingdom ....... 439/681 |

*Primary Examiner*—Larry I. Schwartz
*Assistant Examiner*—Khiem Nguyen
*Attorney, Agent, or Firm*—Robert M. Rodrick; Salvatore J. Abbruzzese

[57] ABSTRACT

A keying arrangement for interconnectable components is disclosed. The keying arrangement is particularly useful for fiber optic connector assemblies having a receptacle connector with key projections integrally formed therewith in one of plural different key positions. These key positions may be dictated by an industry standard. A plug connector of the assembly includes a multi-positionable key element. The key element is positionable in plural different orientations to provide keyways which uniquely accommodate one of the plural different key positions of the receptacle connector. Rotative movement of the key element within the plug connector provides the plural different orientations and thereby the plural keyways.

12 Claims, 2 Drawing Sheets

INTERCONNECTABLE COMPONENTS EMPLOYING A MULTI-POSITIONABLE KEY

This is a continuation of application Ser. No. 07/473,010, filed Jan. 31, 1990, now U.S. Pat. No. 5,041,025.

FIELD OF THE INVENTION

This invention relates generally to components having keying means thereon to permit matched intermateability of one component with another. More particularly, the present invention relates to transmission cable connectors having keying elements thereon.

BACKGROUND OF THE INVENTION

The need for keying interconnectable components is well known. There is a special need in the electrical/electronic area to provide for the keyed interconnection of one component to another. These components may be connectors which terminate electrical or fiber optic cable which when connected provide for transmission of signals therebetween. The connector art has seen a wide variety of techniques for matching together connectors which are to be mated to one another. These techniques include, for example, interfitting parts such as matching projections and recesses which permit a matched set of components to be interconnected while preventing the interconnection of similar connectors which are not intended to be interconnected. Many connectors include these mating projections and recesses formed integrally with the connector housings at various preselected positions. Thus, one particular type of housing would be manufactured for interconnection with another connector specifically designed for interconnection therewith.

An advance in keyed connectors is achieved by providing connectors manufactured to accommodate separate projections at various locations thereon. Thus, after manufacture, each connector could be separately keyed to mate with differently keyed mating connectors. While the latter technique improves upon the former in that it reduces the necessity of manufacturing individually keyed connectors, removable keys of this type have several limitations. Numerous keys must be formed having different shapes and sizes to distinguish one key from another. Alternatively, numerous key positions must be provided on the connector to provide the same distinguishing characteristics. In addition, removable keys typically provide no function to the connector structure other then providing a means for keyed interconnection. Therefore the keys are often misplaced or not used thereby rendering the intended keying function useless.

It is therefore desirable to provide a connector structure having a single key which provides plural mutually exclusive key positions. It is also desirable to provide a keying device for a connector structure whereby the key is necessary for proper operation of the connector structure thereby avoiding inadvertent absence of the key in the connector structure.

SUMMARY OF THE INVENTION

It is therefore an object of the present invention to provide an improved technique for keying interconnectable components.

It is a further object of the present invention to provide a key for interconnectable components which is positionable in one connector structure and provides in various orientations plural mutually exclusive key positions.

It is a still further object of the present invention to provide a removable key for a connector structure, the proper positioning of which is necessary for the operation of the connector structure.

In the efficient attainment of these and other objects, the present invention provides a connector assembly for the interconnection of transmission components. A first connector supporting a first transmission component including a multi-positionable key, removably supported in the first connector. This single key is positionable on the first connector in plural different orientations, each orientation providing a keyway mutually exclusive from the others. A second connector supports a second transmission component and has a key projection which is integrally positioned in one of four different key positions. Each keyway of the first connector uniquely accommodates one of the projection positions of the second connector. Each different key orientation of the first connector is distinguished from the others by rotative repositioning of the single key on the first connector.

As shown by way of the preferred embodiment herein, the projection of the second connector is located at one of plural different keying positions. The single key of the first connector is positionable on the first connector in one of plural different positions to accommodate in mutually exclusive fashion, each of the plural different projection key positions of the second connector.

More specifically, the first connector includes a cover and a base which are secured together by securement means. The key of the first connector comprises part of the securement means so that proper operation of the first connector necessitates inclusion of the key.

DETAILED DESCRIPTION OF THE PREFERRED EMBODIMENT

Figure 1:
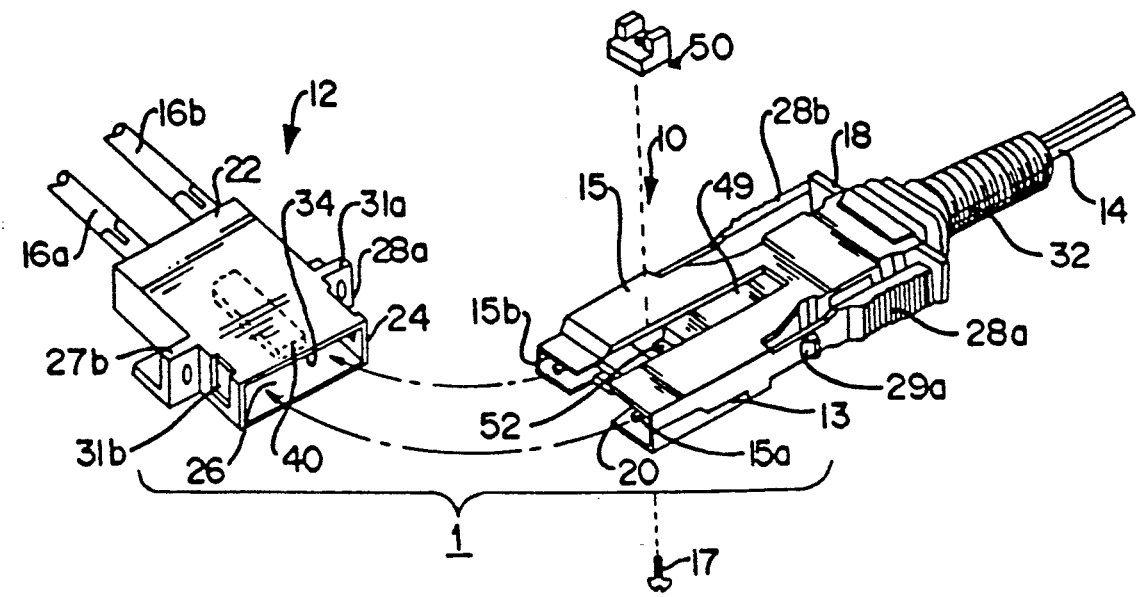
FIG. 1 is a perspective view of the plug and receptacle connectors capable of employing the keying arrangement of the present invention.

FIG. 1 shows connection assembly 1 of the present invention including a male plug connector 10 and a female receptacle connector 12. In accordance with the present invention, plug connector 10 and receptacle connector 12 may be any type of electrical/electronic connector suitable for terminating transmission cable. As particularly shown herein, plug connector 10 and receptacle connector 12 are optical fiber connectors, facilitating the interconnection of one or more optical fibers thereby permitting optical transmission therebetween.

Plug connector 10 terminates a duplex fiber optic cable 14 which supports a pair of optical fibers individually terminated at one end with fiber optic ferrules 15a and 15b. Receptacle connector 12 terminates a pair of optical fibers 16a and 16b which are prepared for optical connection with ferrules 15a and 15b, respectively. While optical fiber connectors are shown as the preferred embodiment herein, it is understood that the present invention may be practiced with other types of connectors such as electrical connectors which terminate conventional copper wire.

The basic configuration of plug connector 10 and receptacle connector 12 conform to an industry standard compiled by the American National Standards Institute (ANSI) and commonly referred to as the Fiber Distributed Data Interface (FDDI). The purpose of industry standards, especially those involving electrical or optical connectors, is to assure a certain degree of conformity among various manufactures of similar components. Thus, an end user having components sold by one manufacturer would be able to interconnect to devices having components made by another manufacturer. While the internal structure may vary as among manufacturers, the outer dimensions as well as the mechanical interaction between the components will be standardized in accordance with this FDDI Standard.

Plug connector 10 includes an elongate generally rectangular body having a cable receiving end 18 and an opposed connection face 20. Receptacle connector 12 is similarly an elongate rectangular member having a cable receiving end 22, an opposed open interconnection face 24 and a central cavity 26. Plug connector 10 is inserted into the open face 24 of receptacle connector 12 to lie within cavity 26. This disposes ferrules 15a and 15b in optical alignment with cable 16a and 16b, respectively.

Describing in more detail plug connector 10, the rectangular body is formed by a cover 13 and base 15 (shown inverted in FIG. 1) which snap together in conventional fashion. A securement screw 17 is used to hold cover 13 to base 15. A pair of deflectable latches 28a and 28b include latch ears 29a and 29b (not shown) which permit mechanical coupling of plug connector 10 in receptacle connector 12. A bend limiting element 32 extends rearwardly from the cable receiving end 18 of plug connector 10 to prevent overflexing of duplex cable 14.

Plug connector 10 further includes a central keying trough 49 which extends along base 15 from connection face 20 toward cable receiving end 18. Trough 49 includes a central square cavity 52 which is provided for receipt of a key element 50 which will be described in detail hereinbelow.

Receptacle connector 12 includes a pair of latch openings 31a and 31b which accommodate respectively latch ears 29a and 29b of plug connector 10 and secure plug connector 10 in receptacle connector 12. Mounting shoulders 27a and 27b permit receptacle connector 12 to be mounted horizontally or vertically as may be necessary in use.

Shown in phantom in FIG. 1, receptacle connector 12 includes an elongate key projection generally denoted as 40. Key projection 40 extends along the undersurface of an upper wall 34 of receptacle connector 12. Key projection 40 is accommodated in trough 49 of plug connector 10 upon interconnection. The precise shape and location of key projection 40 as will be described hereinbelow, is dictated by the particular key arrangement desired.

Figures 4A, 4B, 4C, 4D, 5A, 5B, 5C, 5D:
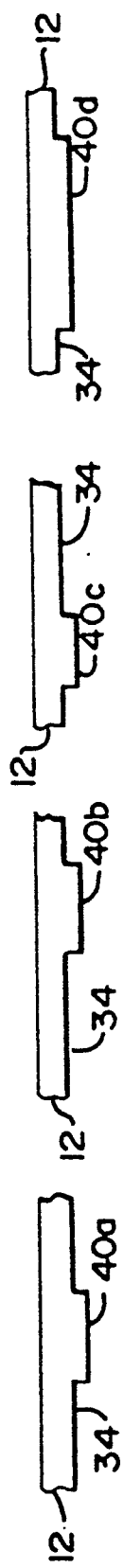
FIGS. 4A through D and 5A through D show schematically four different orientations of the key element shown in FIG. 2 supported in the recess shown in FIG. 3 for connection with the corresponding mating connector of the type shown in FIG. 1.

The purpose of the connection assembly 1, as set forth in the FDDI Standard, is for use in a token ring network for the transmission of data in a closed loop among numerous stations. The arrangement of each station varies to accommodate the users needs. In addition to standardizing the shape and interconnection functions of these connectors, consideration has also been given to standardizing the keyability of these connectors. Again, standardization of the keying is necessary to permit interchangeability of components of various manufacturers. FIGS. 4A through 4D show one set of standard key arrangements set forth by the FDDI Standard for receptacle connector 12. Shown in partial schematic view, the key position in FIG. 4A is a small rectangular key projection 40a centrally depending from the undersurface of upper wall 34. Shown in FIG. 4B, a second key position is denoted by a rectangular projection key 40b positioned slightly right of center. Similarly, FIG. 4C shows a third key position including a rectangular key projection 40c disposed slightly left of center. A fourth key position shown in FIG. 4D includes a centrally disposed key projection 40d which is substantially wider then centrally disposed projection 40a of FIG. 4A. While four key positions are shown as forming part of the above-identified FDDI Standard, it, however, may be understood that other key positions are possible.

Referring again to FIG. 1, to permit keyed accommodation of plug connector 10 into receptacle connector 12, the present invention employs a key element 50 which is positionable in central cavity 52 of plug connector 10. Key element 50 as well as cavity 52 are shown in greater detail in FIGS. 2 and 3.

Figure 2:
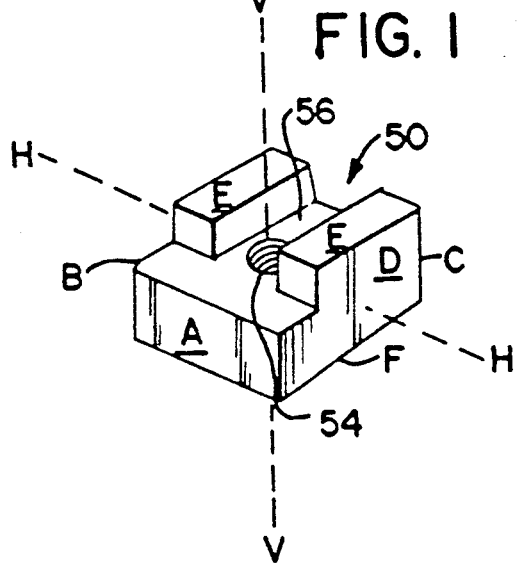
FIG. 2 is a perspective showing of the key element of the present invention.

As shown in FIG. 2, key element 50 is generally parallelepiped in shape including six major surfaces labeled (A) through (F) in FIG. 2 for clarity. Key element 50 includes a central threaded aperture 54 which accommodates threaded screw 17 as will be described in further detail hereinbelow. As shown in FIG. 2, upper surface (E) of key element 50 includes a T-shaped recess 56 which, when arranged in cavity 52, defines separate keyways for accommodating the key projections 40 of receptacle connector 12.

Figure 3:
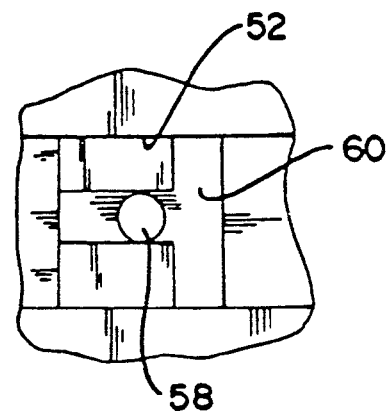
FIG. 3 is a top plan view of a portion of the plug connector of FIG. 1, particularly showing a recess which accommodates the key element of FIG. 2.

Referring to FIG. 3, cavity 52 is of a shape complimentary to key element 50 and includes a central aperture 58 for alignment with threaded aperture 54 of key element 50. Cavity 52 includes a raised floor portion 60 in the shape of a T which is complimentary in shape to recess 56 of key element 50. Cavity 52 is designed to receive key element 50 with central aperture 58 in alignment with threaded aperture 54 so as to receive threaded screw 17 (FIG. 1) which also secures key element 50 in recess 56. The shape of key element 50 and cavity 52 are selected so as prevent rotation of key element 50 within cavity 52.

Key element 50 is positionable in cavity 52 in plural orientations. Each orientation differs from another by rotative movement of key element 50. FIGS. 5A through 5D define four distinct positions of key element 50 within cavity 52 which define four different keyways corresponding respectively to the four different key positions of plug connector 12 shown in FIGS. 4A through 4D.

In FIG. 5A, key element 50 is positioned within cavity 52 such that a first keyway 70 is formed. Keyway 70 defined by a portion of T-shaped recess 56 (FIG. 2) is centrally disposed. Keyway 70 is formed by positioning key element 50 in cavity 52 with surface C positioned as a front face and with surface E as the upper face and surface F as the lower face. In this position, keyway 70 will uniquely accommodate the first key position of rectangular connector 12 defined by rectangular projection 40a. Rotation of key 50 from the position shown in 5A to the position shown in 5B defines a second keyway 72 which uniquely accommodates the second key position of receptacle connector 12 defined by rectangular projection 40b. Position of key element 50 in FIG. 5B is achieved by rotation of key element 50 90 degrees about central vertical axis V shown in FIG. 2. Thus, in the position shown in FIG. 5B, surface B is now the front face. A third key element position is shown in FIG. 5C. Keyway 74 is formed by rotation of key element 50 about central vertical axis V 90 degrees in a direction opposite from that achieved for the position shown in FIG. 5B. In this position, with surface D being the front face, keyway 74 accommodates the third key position of receptacle connector 12 defined by rectangular projection 40c. To achieve a fourth key element position, key element 50 is rotated 180 degrees from the position shown in FIG. 5A about horizontal axis H (FIG. 2) so that raised floor portion 60 is accommodated by T-shaped recess 56 (FIG. 2). Surface C remains as the front face and surface F is the upper face. A fourth keyway, 76 is formed which is complimentary to the fourth key position of receptacle connector 12 defined by rectangular projection 40d.

It can be seen that each of the keyways 70–76 shown in FIGS. 5A through 5D uniquely accommodate one of the key positions shown in FIGS. 4A through 4D. For example, when key element 50 is positioned as shown in FIG. 5A, only receptacle connector 12 having rectangular projection 40a as shown in FIG. 4A will be accommodated therein. The other key positions shown in FIGS. 4B through 4D will be prevented from being interconnected therewith.

It is understood that key element 50 may take other configurations which would provide differently positioned keyways. The present invention is not limited to the particular shape of key element 50 or the four keyways defined thereby. Rather, the present invention provides a key element which in a single structure defines plural keyways, each keyway being uniquely defined by rotative positioning of a single key element in the cavity.

A further feature of the present invention includes the manner of securement of key element 50 to base 15 of plug connector 12. As mentioned above with respect to FIG. 1, cover 13 is held to base 15 by screw 17. Securement of screw 17 is achieved by screw engagement with the threaded aperture 54 of key element 50. In practice key element 50 also functions as a securement nut. The cover 13 cannot be properly secured to base 15 without use of securement screw 17 and key element 50. Thus, the key element 50 cannot be inadvertently left out from the assembly of plug connector 10.

Various changes to the foregoing described and shown structures would not be evident to those skilled in the art. Accordingly, the particularly disclosed scope of the invention is set forth in the following claims.

I claim:

1. A connector assembly for the transmission components comprising:
    a first connector supporting a first transmission component;
    said first connector, said key element including plural discrete keyways thereon, said key element being positionable on said first connector in different positions to render accessible only one of said plural keyways; and
    a second connector supporting a second transmission component and matingly engageable with said first connector; said second connector having a key projection positioned for unique reception in one of said keyways of said first connector.

2. A connector assembly of claim 1 wherein said first connector includes a cavity which insertably accommodates said key element in of any of said four different positions.

3. A connector assembly of claim 2 further including means for securing said key element in said cavity of said first connector.

4. A connector assembly of claim 3 wherein said first connector comprises a base, a cover and means for attaching said cover to said base.

5. A connector assembly of claim 4 wherein said means for attaching said cover to said base includes said means for securing said key element in said cavity.

6. A connector assembly of claim 1 wherein said first and second transmission components are optical fibers.

7. A connector assembly of claim 5 wherein said key element includes a pair of opposed surfaces, each of said surfaces including at least one said keyway.

8. A connector assembly of claim 7 wherein said key element includes a threaded aperture through said opposed surfaces and wherein said assembly means includes a threaded fastener securable through said base and said cover to said key element through said aperture.

9. A fiber optic connector assembly comprising:
    a first connector supporting a first optical fiber;
    said first connector including a cavity and a key element in the shape of a polyhedron insertably accommodated in said cavity of said first connector in plural key element positions; said key element including discrete keyways, one said keyway in each of said key element positions; and
    a second connector supporting a second optical fiber and matingly engagable with said first connector, said second connector having a key projection positioned for unique reception in one of said keyways of said first connector.

10. A connector assembly in claim 9 wherein said key element includes at least two sides with at least one said keyway on each side thereof.

11. A connector assembly of claim 10 wherein said first connector includes a cover and a base secured together with a threaded fastener.

12. A connector assembly of claim 11 wherein said key element includes a threaded aperture for receipt of said threaded fastener.

* * * * *

UNITED STATES PATENT AND TRADEMARK OFFICE
CERTIFICATE OF CORRECTION

PATENT NO.    :    5,167,542

DATED         :    December 1, 1992

INVENTOR(S)   :    Louis F. Haitmanek

It is certified that error appears in the above-identified patent and that said Letters Patent is hereby corrected as shown below:

Col. 6, line 2, delete "the".

Col. 6, line 6, after "connector" insert --including a key element positionable on said first connector--.

Signed and Sealed this

Seventh Day of June, 1994

Attest:

BRUCE LEHMAN

Attesting Officer           Commissioner of Patents and Trademarks